United States Patent Office 2,712,000
Patented June 28, 1955

2,712,000

EPOXIDE COMPOSITIONS CONTAINING HALOGEN

John D. Zech, Wilmington, Del., assignor to Devoe & Raynolds Company, Inc., Louisville, Ky., a corporation of New York No Drawing. Application December 31, 1951, Serial No. 264,347

3 Claims. (Cl. 260—47)

This invention has to do with epoxides, and, more particularly, has to do with a new and novel class of halogen-containing ether epoxides.

For a clear understanding of the reactants, products and process of this invention, the following definitions are set forth. As used herein, the term "epoxide" denotes a compound characterized by the presence of at least one cyclic ether group, namely one wherein an ether oxygen atom is attached to two adjacent carbon atoms thereby forming a cyclic structure. The term "epoxy" also describes the foregoing cyclic ether group. The language "epoxide compositions" and "epoxy" compositions refers to compositions in which one or more epoxides are present. The epoxides present in such compositions may contain one or a plurality of epoxide groups. The term "ether epoxide" as used herein identifies an epoxide characterized by at least one of the aforesaid epoxide groups and by at least one ether oxygen linkage, carbon to oxygen to carbon in a non-cyclic group, in contrast with a cyclic ether group. The term "halogen-containing ether epoxide" denotes an ether epoxide of the foregoing type wherein one or more halogen atoms are present. Similarly, the term "halogen-containing ether epoxide compositions" is used to describe a composition predominantly comprised of at least one such epoxide. The nature of the halogen in said ether epoxides is more fully described herein below in connection with the description of the polyhalohydrin ethers from which said halogen-containing ether epoxides are formed.

The term "polyhalohydrin ether" describes aliphatic, cycloaliphatic and aryl-substituted aliphatic compounds, all of which are characterized by the following:

(a) at least one non-cyclic ether linkage,
(b) at least one hydroxyl group attached to a carbon atom, forming a carbinol group,
(c) two or more halogen atoms,
(d) at least one of said halogen atoms being attached to a carbon atom adjacent to a carbinol group, and
(e) at least one of said halogen atoms (c) being attached to a carbon atom not adjacent to a carbinol group.

The term "polyhalohydrinether" is used here, however, in a somewhat restricted sense, in that such compounds of chlorine, bromine and/or iodine are included, and those containing only fluorine halogen are excluded. That is, polyfluorhydrin ethers containing only fluorine as a characterizing halogen atom, are excluded; however, polyhalohydrins containing chlorine, bromine and/or iodine attached to a carbon atom adjacent to a carbinol group (see (d) above), in addition to fluorine, are contemplated herein. This limitation is imposed in view of the relative stability of the carbon-fluorine bond or, in other words, the relative lack of reactivity of fluorine in such compounds. "Polyhalohydrin ether composition" and "polyhalohydrin ether compositions," indicate a composition or compositions in which one or more of the aforesaid polyhalohydrin ethers predominate.

"Partial dehydrohalogenation," as used herein, describes a process wherein a hydrogen halide is removed from a polyhalohydrin ether to form new and novel halogen-containing ether epoxide. As indicated above in describing a polyhalohydrin ether, the hydrogen halide removed is predominantly a chloride, bromide or iodide, and the halogen thereof is predominantly the halogen which had been attached to a carbon atom adjacent to a carbinol group of said polyhalohydrin ether.

Applying the foregoing defining language, the new and novel class of halogen-containing ether epoxides of this invention are those obtained by: condensing an epihalohydrin, preferably an alpha-epihalohydrin, with a polyhydric phenol in the proportion of at least about two molar quantities of said epihalohydrin per molar quantity of said polyhydric phenol whereby a polyhalohydrin ether is formed, said polyhalohydrin ether containing at least one non-cyclic ether linkage, at least one carbinol group, two or more halogen atoms, at least one of said halogen atoms being attached to a carbon atom adjacent to a carbinol group and at least one of said halogen atoms being attached to a carbon atom not adjacent to a carbinol group; partially dehydrohalogenating said polyhalohydrin ether with an alkaline material whereby a reaction mixture containing a halogen-containing ether epoxide is formed, the halogen attached to a carbon atom adjacent to a carbinol group of said polyhalohydrin ether being substantially removed therefrom by said dehydrohalogenation and the halogen attached to a carbon atom not adjacent to a carbinol group of said polyhalohydrin ether being substantially unreacted and characterizing said ether epoxide; and separating said halogen-containing ether epoxide, or a fraction predominantly comprised of one or more such ether epoxides, from said reaction mixture. These new and novel ether epoxides, and the preparation thereof, are described in detail herein below.

*Polyhalohydrin ethers*

In forming the aforesaid halogen-containing ether epoxides contemplated herein, an epihalohydrin and a polyhydric phenol or mixture thereof, are first condensed, in the aforesaid proportions, in the presence of a suitable condensation catalyst whereby a polyhalohydrin ether or mixture of polyhalohydrin ether is formed. It will be understood that, in view of the high degree of chemical functionality of the aforesaid reactants, small amounts of other condensation products may be present with the polyhalohydrin ether or ethers. Such by-products, however, may be present during the subsequent partial dehydrohalogenation and do not interfere with the course of such treatment. As indicated herein above, at least about two molar quantities of an epihalohydrin is used for each molar quantity of the polyhydric phenol. While this is the lower limit of the proportion range, a large excess of the epihalohydrin may also be used, whereupon satisfactory polyhalohydrin ethers are formed, which when partially dehydrohalogenated, provide one or more of the halogen-containing ether epoxides. The preferred range of proportions for the preparation of the most desirable products, however, are the following. With a dihydric phenol, substantially two to four molar quantities of an epihalohydrin are used for each molar quantity of dihydric phenol; expressed in another manner, substantially one to two molar quantities of epihalohydrin are used for each hydroxyl group of the dihydric phenol. For a trihydric phenol, the preferred range is substantially two to six molar quantities of an epihalohydrin for each molar quantity of trihydric phenol, or substantially ⅔ to 2 molar quantities of epihalohydrin are used for each hydroxyl group of the trihydric phenol. Continuing, substantially two to eight molar quantities of an epihalohydrin are used for each molar quantity of a tetrahydric phenol, or substantially ½ to 2 molar quantity of epihalohydrin for each hydroxyl group of tetrahydric phenol.

The preferred range of proportions for polyhydric phenols having more than four hydroxyl groups will now be readily recognized from the foregoing.

As the proportions of epihalohydrin and polyhydric phenol are varied within the aforesaid ranges, the character of the polyhalohydrin ethers formed therefrom is somewhat modified. In turn, the halogen-containing ether epoxides derived from the polyhalohydrin ethers are also varied.

Polyhydric phenols which may be used for the preparation of the aforesaid polyhalohydrin ethers are illustrated by the following:

*Polyhydric phenols* hydroquinone
resorcinol
phloroglucinol
pyrogallol
bisphenol (predominantly 4,4'-dihydroxy diphenyl dimethyl methane)
dihydroxy diaryl sulfones, etc.

Epihalohydrins used in preparing the aforesaid polyhalohydrin ethers include epichlorhydrin, epibromhydrin and epiiodohydrin, and are preferably in alpha form. The latter materials are all characterized by a three carbon chain; however analogs of the aforesaid epihalohydrins may also be used. Examples of the latter are beta- and gamma-methyl epichlorhydrins, 1,4-dichloro-2,3-epoxy butane; etc. It will be noted that epifluorhydrin and its analogs are not referred to above. Inasmuch as fluorine is rather unreactive in such epoxy compounds, the latter are not contemplated herein. Accordingly, the term "epihalohydrin" as used in connection with the preparation of complex halohydrins, throughout the specification and appended claims, defines compounds in which the halogen is chlorine, bromine and iodine, and is exclusive of fluorine. In view of its availability and relatively low cost, epichlorhydrin is preferred.

Hydroxyepoxides, in place of epihalohydrins, may be reacted with suitable halogen-containing compounds to form polyhalohydrin ethers, the latter providing valuable halogen-containing ether epoxides when partially dehalohydrogenated. Typical of such hydroxy epoxides is glycidol. Representing the halogen-containing compounds are organic polybasic halides, such as phthallyl dichloride, etc.; the inorganic acid halides, such as $PCl_3$, $POCl_3$, $SiCl_4$, $SOCl_2$, $SCl_2$, etc.; diethyl dichlorsilane, ethyl dichorsilane; etc.

Along with epihalohydrins you may also use diepoxides, such as diglycide ether, butadiene dioxide, etc. Such a mixture of diepoxides and epihalohydrins may be condensed with any of the polyhydric phenols listed above to form polyhalchydrin ethers which yield halogen-containing ether epoxide compositions upon dehydrohalogenation.

As aforesaid, condensing catalysts are used in reacting an epihalohydrin with a polyhydric phenol, for the formation of a polyhalohydrin ether or polyhalohydrin ether composition. Typical catalysts are those of the Friedel-Craft type, including anhydrous $AlCl_3$, $BF_3$, $ZnCl_2$, $FeCl_3$, $SnCl_4$, and complexes such as the well known $BF_3$ etherates, etc.; acid type catalysts including HF, $H_2SO_4$, $H_3PO_4$, etc.; basic type catalysts such as NaOH, KOH, sodium acetate, etc.; others such as $SbCl_5$, etc. Concentration of catalyst may be varied, depending upon the individual catalyst. For example, from about 0.1% to about 0.2% of $BF_3$ or a complex thereof, based upon the total quantity of reactants, provide satisfactory results. When greater concentrations of the latter catalysts are used, the resulting polyhalohydrin ether compositions are generally darker in color. In general, then the converting catalyst is used in small concentration, up to about 5% but generally less than 1% of the total reactants, particularly when $BF_3$ type catalysts are employed. With certain of the less active catalysts, i. e. $SbCl_5$, etc., larger amounts may be used to advantage.

The polyhalohydrin ethers are advantageously formed by reacting the epihalohydrin and polyhydric phenol, in the presence of a suitable condensing catalyst, at a temperature between about 25° C. and about 175° C. In general, temperatures above about 130° C. cause some darkening in color of the polyhalohydrin ether composition, but may be advantageously used when very light color is no object. Further, temperatures of the order of 25 C. generally provide a slow reaction rate, unless relatively large concentrations of catalyst are used. Most satisfactory results, that is, proper rate of reaction and light color of product, are obtained with temperatures in the neighborhood of 75–125° C.

The condensation of an epihalohydrin and a polyhydroxy phenol may be carried out in any one of several ways. For example, the two reactants may be mixed at room temperature and the catalyst may be added thereto. Condensation is relatively slow initially, becoming more rapid as the temperature rises due to the liberation of heat. Generally, the temperature rises appreciably so that efficient cooling must be applied to prevent violent reaction. A preferred method involves adding the catalyst to the hydroxy phenol and then adding the epihalohydrin thereto gradually at a temperature of about 50–125° C. This provides a more uniform product and greater control over the reaction. Inasmuch as the reaction is exothermic, cooling can be applied to shorten the time required for the addition of the epihalohydrin. By proper adjustment of the rate of cooling and rate of addition of the epihalohydrin, the reaction can be carried out at the desired temperature in a minimum period of time.

*Partial dehydrohalogenation*

As indicated herein above, alkaline materials are used to partially dehydrohalogenate the aforesaid polyhalohydrin ethers, thereby providing the desired halogen-containing epoxide ethers. In general, a number of alkaline materials may be used for the dehydrohalogenating agents, with varying degrees of efficiency. Numerous alkaline materials are known for dehydrohalogenating halohydrins to produce epoxides and all such materials, and procedures for using the same, are contemplated herein. For example, aqueous and anhydrous sodium hydroxide may be used, the latter being shown in Patent No. 1,446,872. A large number of basic reacting metal salts of strong bases and weak acids are shown as dehydrohalogenating agents in Patent Nos. 2,061,377; 2,070,990; 2,224,849; 2,248,635 and 2,314,039. Illustrative of such alkaline materials are: sodium and potassium carbonates and bicarbonates; borax; hydroxides of magnesium, zinc, lead, iron and aluminum, and the corresponding oxides; etc. While such materials may be used, yields of the desired halogen-containing ether epoxides are generally small, in view of undesirable side-reactions. It has been noted that strong alkalies tend to hydrolyze and polymerize epoxides, thereby reducing the yield. Further, powdered sodium and potassium hydroxides, require low reaction temperatures to reduce their polymerization action, when suspended in non-aqueous liquids. Similarly, powdered lime, or $Ca(OH)_2$, is relatively slow in reacting with halohydrins in non-aqueous media, yet it exercises a pronounced polymerization effect on the epoxide product or products. A number of the previously mentioned basic reacting metal salts of strong bases and weak acids have been found to be only slightly efficient in converting the polyhalohydrin ethers to the halogen-containing ether epoxides when used in non-aqueous media. Sodium acetate has no value whatsoever for this purpose. Moreover, some alkaline materials such as sodium cyanide, sodium sulfide etc., do not dehydrohalogenate but instead remove the halogen to give undesirable derivatives. Ammonia and amines, with the exception of tertiary amines are also unsuitable basic reagents. For this reason in this specification and the appended claims, the term inorganic alkali material is intended to include the oxides and hydroxides of the alkali and alkaline earth metals, together with the alkali metal aluminates, silicates and zincates.

As pointed out in application Serial No. 754,080, filed June 11, 1947, now Patent 2,538,072, January 16, 1951, of which application Serial No. 774,429 filed September 16, 1947 is in part a continuation, and of which latter application this application is in part a continuation, it has been found that certain aluminates, silicates and zincates are outstanding dehydrohalogenating agents when used in substantially, or completely, non-aqueous media. Generally no water is added to the reaction mixture although exceptions may be made, particularly in the case of sodium aluminate as pointed out hereinbelow. In such a medium, these new dehydrohalogenating materials effectively remove hydrogen halide from polyhalohydrin ethers and, yet, have little or no tendency to induce polymerization or hydrolysis of the halogen-containing ether epoxides so formed. These partial dehydrohalogenating materials are basic-reactive metal aluminates, silicates, and zincates, of which the alkali metal and particularly sodium and potassium, compositions are preferred. Representative of such materials are the following:

A. Aluminates of alkali metals, such as $Na_3AlO_3$, $Na_2Al_2O_4$, $Na_2Al_2O_4 \cdot xH_2O$ (where $x$ represents the quantity of associated water), $K_2Al_2O_4$.

B. Zincates of alkali metals, principally sodium and potassium.

C. Silicates of alkali metals, either anhydrous or hydrated orthosilicates, metasilicates, disilicates, trisilicates, sesquisilicates, etc. Typical of such materials are $Na_2SiO_3 \cdot 5H_2O$, $3Na_2 \cdot 2SiO_2 \cdot 11H_2O$, $Na_4SiO_4$ and $Na_2SiO_3$.

The conditions required for a high degree of conversion of a polyhalohydrin ether to a halogen-containing ether epoxide varies somewhat with the foregoing aluminates, silicates, and zincates. When sodium aluminate is used, it is preferred to carry out the reaction at temperatures of the order of 70–105° C., although satisfactory results are obtained with temperatures from about −25° C. to about 125° C. With temperatures below about 70° C. the reaction time is relatively long. With temperatures within the preferred range of 70–105° C., reaction is usually complete in 1–3 hours, with quantities of reactants such as shown in the following illustrative examples. The quantity of sodium aluminate used with the polyhalohydrin ether may be varied considerably. A quantity containing a slight excess is generally desirable; that is, the quantity of sodium aluminate used is such that the sodium content is slightly in excess of the halogen content of the polyhalohydrin ether reactant. Even a large excess of sodium aluminate may be used without decreasing the yield of (halogen-containing ether) epoxide product, thus illustrating the absence of a polymerization effect. It has been further discovered that particularly outstanding results are realized when a small amount of water is used with sodium aluminate in the reaction. The quantity of water used is preferably of the order of about 1% to about 15% of the quantity of sodium aluminate, but as much as about 30% of water may be used with a large quantity of a water-miscible organic diluent. If substantially larger quantities of water are used, the yield of (halogen-containing ether) epoxide product is decreased, perhaps, by hydrolysis and/or polymerization of the product. Outstanding for use herein are sodium and potassium aluminates.

With regard to zincate reactants, the sodium salts are again preferred in view of their excellent characteristics and availability. These salts appear to be more reactive than the corresponding aluminates. Thus, somewhat lower temperatures and shorter reaction periods may be used. In general, a reaction period of ½ hour to 1 hour at 70° C., with quantities of reactants such as shown in the following typical examples, provides excellent conversion of polyhalohydrin ether to a halogen-containing ether epoxide. Reaction temperature may be advantageously varied, however, from about −25° C. to about 125° C., with reaction periods varying from ½ hour to about 10 hours. The quantity of zincate used with a polyhalohydrin ether preferably varies from about an equivalent quantity to about ⅓ of an equivalent; an equivalent quantity of zincate is one containing a quantity of alkali metal, e. g. sodium, equivalent to the halogen content of the polyhalohydrin ether.

When polyhydric phenols are reacted with epichlorhydrin, a mixture of products is formed, depending on the proportions, and including monochlorhydrin, dichlorhydrin and complex chlorhydrin ethers, such as illustrated by the following equations:

I

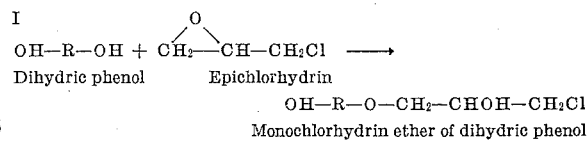

II

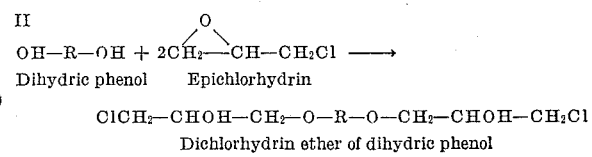

III

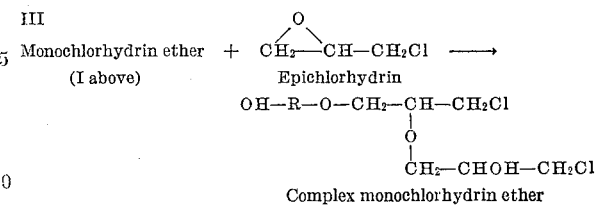

IV

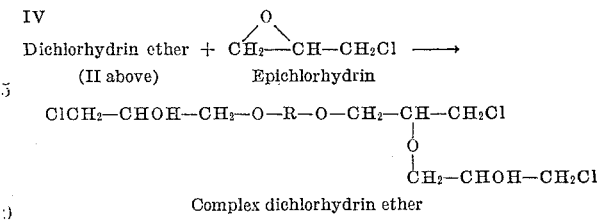

On dehydrohalogenation of the chlorhydrin mixture of products such as illustrated above, a mixture of polyepoxide products is obtained, including chlorine-containing complex epoxides, as illustrated by the following formulas:

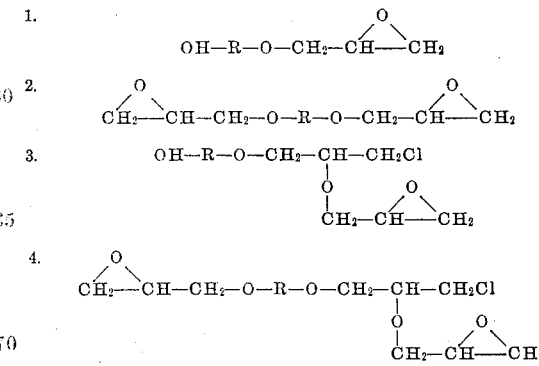

The free phenolic hydroxyls of 1. and 3. above can react further with epoxide groups of 2. or 4. so that the dehydrohalogenation of mixtures of such chlorhydrins results in the production of a mixture including more complex polymeric resinous products, such as the following:

5.

6.

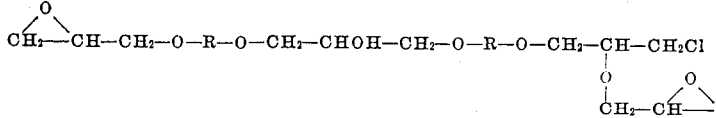

These polyepoxides are admixed with polyepoxides such as indicated at 2. and 4. above, so that the mixture can be considered to have the general formula

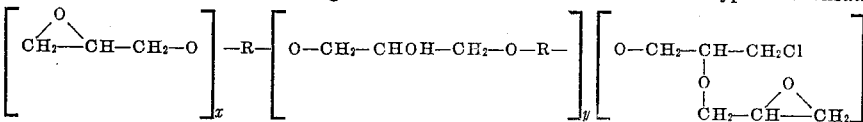

where $x$ is a greater than 1,
where $y$ varies from 0 to 1 or more, $z$ is less than 1 and $x$ pluz $z$ equals about 2.

Where $y$ equals zero, the mixture is a mixture of monomeric products, such as 2. and 4. above, but such monomeric products will be admixed with polymeric products where $y$ equals 1 or more.

Particularly preferred of the zincates is a sodium zincate having a zinc oxide content of about 30%, and a sodium oxide content of about 42%.

The silicates listed above are illustrative of a relatively large number which may be used herein. Generally, the reaction conditions are substantially the same as those resorted to when the aluminates and/or zincates are involved. That is, reaction temperatures from about —25° C. to about 125° C., and reaction periods of from about ½ hour to about 10 hours are satisfactory; preferred, however, are temperatures of the order of 50 to 105° C. and reaction periods of ½ to 3 hours. The very highly alkaline silicates are preferably used in substantially theoretical quantities with the polyhalohydrin ether condensates, as described above in connection with zincate reactants. In order to realize the maximum benefit of the alkali metal content of the anhydrous silicates, they should be finely powdered before use. This may be suitably accomplished by known methods, such as grinding in a ball mill, rolling mill, etc. Typical silicates which provide better results when finely powdered are anhydrous sodium meta-, sesqui-, and ortho-silicates; such materials are extremely hard and glass-like. Particular preference is given herein to the following silicates; anhydrous sodium ortho silicates, hydrated sodium meta and sesqui silicates.

Several relationships influence the efficacy of the dehydrohalogenating reagents. Among these are—particle size and surface area; and amphoteric metal oxide content, such as Al₂O₃, SiO₂, ZnO. As previously indicated, the extremely hard, glass-like anhydrous silicates are more effective when finely powdered. Most effective use of these materials is realized when the particle size is low as of the order of 60 mesh or finer. This relationship is of less import with hydrated silicates, aluminates and zincates, which generally disintegrate or disperse readily in the polyhalohydrin ether-solvent mixture. Even with the latter salts, however, it is preferred that the particle size be relatively small, and of the character noted in connection with the finely powdered silicates.

As indicated herein above, the partial dehydrohalogenation treatment is affected in a non-aqueous, or substantially non-aqueous medium when the aforesaid aluminates, silicates, and/or zincates are used. Organic solvents or diluents which may be used, and which are substantially unreactive in this treatment, include: hydrocarbons such as benzene, toluene, etc.; ketones such as acetone, methyl ethyl ketone, etc.; ethers typified by diethyl ether, methylal, dichlorethyl ether (chlorex), 1,3-dioxolane and dioxane; halides such as ethylene dichloride, carbon tetrachloride, etc. Of such solvents, dioxane is particularly satisfactory, and is preferred. In general, organic solvents which are infinitely miscible with water appear to facilitate filtration, especially when sodium zincate is used as the partial dehydrohalogenating agent. With ketones, such as acetone, a small amount of aldol type condensation may occur, particularly with

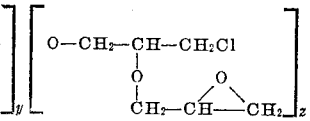

sodium zincate or sodium orthosilicate, leading to the formation of diacetone alcohol and/or mesityl oxide; this in no way effects the yield of halogen-containing ether epoxide.

In the partial dehydrohalogenation reaction, with the preferred alkaline materials, the polyhalohydrin ether or polyhalohydrin ether composition and the aluminate, silicate and/or zincate are brought together in the proportions indicated above. Reaction may be carried out at temperatures from about —25° C. to about 125° C. The preferred temperatures, however, are indicated above in the discussion of the various aluminates, silicates and zincates. The partial dehydrohalogenation material and the polyhalohydrin ether react with the formation of an alkali halide. Presumably, the alkali metal of the aluminate, for example, reacts with the halogen acid removed from the polyhalohydrin ether, with the formation of an alkali metal halide. The halogen so removed from the said ether is predominantly halogen attached to a carbon atom adjacent to a carbinol group of said ether. The halogen thereof not so positioned is substantially unreacted. Apparently no aluminum halide is formed in the reaction; however, Al(OH)₃ and/or Al₂O₃ is formed. At the end of the reaction period, the reaction mixture is filtered through a suitable filter medium, e. g. diatomaceous earth, to remove alkali metal halide, alumina, hydrated alumina and excess aluminate (if an excess had been used). The filter cake so formed is washed with solvent to remove traces of product entrained therein. The alumina may be recovered from the filter cake and reconverted to an aluminate by known procedure. The solvent is then recovered by distillation as the distillate, leaving the halogen-containing ether epoxide product as a residue in the case of a relatively non-volatile ether epoxide product. When the ether epoxide product is volatile, it may be obtained as a fraction of the total distillate. It is generally desirable, however, to remove the solvent by vacuum distillation, in order to avoid heating the ether epoxide products to high temperatures.

When sodium zincate is used in the dehydrohalogenation treatment, sodium chloride and ZnO or Zn(OH)₂ are formed. These by-products, and any excess zincate, are removed from the reaction by filtration as when an aluminate is used. The zinc oxide may be recovered from the filter cake and reconverted to a zincate by known procedure. Sodium zincate is somewhat more advantageous than the corresponding aluminate, in that it is somewhat more reactive. As indicated above, lower reaction temperatures and shorter reaction periods may be used; so also, less zincate is required for a given conversion of halohydrin to epoxide. As a result, a smaller filter cake is obtained; also less solvent is required for washing the filter cake. In addition a smaller filter press is required.

When a sodium silicate is used, sodium chloride and SiO₂ and/or its hydrates are formed. As with treatment with an aluminate and/or zincate, these by-products may be removed by filtration. Certain silicates are particularly convenient for use in the dehydrohalogenating treatment, inasmuch as they are converted therein to a stiff paste which clings to the sides of the reaction vessel in which the treatment is effected. At the end of the reaction treatment, filtration is unnecessary; the solution of halogen-containing ether epoxide product may be simply poured from the reaction vessel, or may be siphoned therefrom. Hydrated silicates are so characterized.

The halogen-containing ether epoxide compositions prepared as indicated by the foregoing may be fractionated by various fractionation procedures well known in the chemical art. For example, they may be subjected to vacuum fractionation, solvent fractionation, chromatographic fractionation, etc.

In affecting the aforesaid partial dehydrohalogenation, super, and sub-atmospheric pressures may be used. For instance, when a low boiling solvent, such as diethyl ether, is involved super-atmospheric pressure is advantageous. Also, the partial dehydrohalogenation may be carried out in a batch or a continuous operation.

*Illustrative examples*

The following examples are provided to illustrate the invention; and are not to be construed as limitations thereof. The examples illustrate the individual halogen-containing ether epoxides contemplated herein and, in addition, illustrate the various polyhydric ethers and partial dehydrohalogenating materials used in preparing said ether epoxides. The examples also serve to illustrate the procedures used in forming the said polyhalohydrin ethers and ether epoxides. In each of the following examples, unless otherwise indicated, the viscosities are those of the "Gardner-Holt" scale, and average molecular weights are those obtained by standard freezing point depression method with benzophenone.

The epoxide content of the epoxide product was determined by heating a sample of the epoxide composition with an excess of pyridine containing pyridine hydrochloride, at the boiling point for 20 minutes, and back titrating the excess pyridine hydrochloride with 0.1 normal sodium hydroxide, using phenolphthalein as indicator. One HCl is considered equivalent to one epoxide group. The pyridine-pyridine hydrochloride solution is made by adding 16 ccs. of concentrated hydrochloric acid per liter of pyridine. By epoxy equivalent we mean that weight of the material which contains one epoxy group.

*Example 1*

228 g. bisphenol, 185 g. epichlorohydrin and 2 g. anhydrous sodium acetate were placed in a flask and refluxed. It began refluxing at 130° C. and 3½ hours later it was refluxing at 150° C. It was held for another 10 hours at 150° C. to complete the condensation. The product was dissolved in dioxane and treated with sodium aluminate to give a hard resin with a softening point of 58° C. (Durran's method) an epoxide equivalent of 443, and a chlorine content of 2.5 per cent.

*Example 2*

228 g. bisphenol, 185 g. epichlorohydrin and 600 ccs. of dioxane were placed in a three-liter, three-necked flask fitted with a stirrer, a thermometer and a reflux condenser. 180 g. sodium aluminate were added while stirring and the mixture refluxed at 95–100° C. for five hours. The mixture was filtered and the solvent distilled off leaving 308 g. of soft resin with an epoxide equivalent of 361. The product so obtained contained chlorine.

*Example 3*

220 g. of resorcinol and 370 g. of epichlorohydrin were placed in a two-liter, three-necked flask equipped with a stirrer, reflux condenser and thermometer. At a temperature of 45° C. 3 cc. of a 4.5% solution of boron trifluoride in ethyl ether were added to the reaction mixture. After the exothermic reaction had subsided the mixture was cooled to 45° C. and an additional 3 cc. of boron trifluoride solution was added. A second exothermic reaction set in which took the reaction to completion.

295 g. of the resorcinol-epichlorhydrin condensate so produced in solution in 295 g. of acetone were placed in a two-liter, three-necked flask equipped with stirrer, reflux condenser and thermometer. At 45° C. 111 g. of sodium zincate (30% ZnO) were added and the reaction mixture was agitated for one hour at 45–50° C. The mixture was filtered and the solvent was removed by vacuum distillation. A resinous product, 215 g., was obtained with a melting point of 39° C., an epoxide equivalent of 1351, and which contained chlorine.

*Example 4*

A mixture of 456 g. of bisphenol and 250 g. of methyl ethyl ketone was placed in a three-liter, three-necked flask equipped with stirrer, reflux condenser, thermometer and dropping funnel. The mixture was heated to 60° C. to dissolve the bisphenol and 10 cc. of a 4.5% solution of boron trifluoride in ethyl ether were added. 370 g. of epichlorhydrin were then added gradually over a period of thirty minutes. With external cooling the temperature of the reaction mixture was held at 65 to 70° C. After the addition of epichlorohydrin was completed the mixture was stirred for an additional thirty minutes at 65–70° C.

A portion of the product so produced, 538 g., containing 413 g. of the bisphenol-epichlorhydrin condensate and an additional 250 g. of methyl ethyl ketone, were placed in a two-liter three-necked flask equipped with a stirrer, reflux condenser and thermometer. At 45° C. 111 g. of sodium zincate (30% ZnO) were added and the mixture was heated with stirring at 50–60° C. for one hour. The reaction mixture was then filtered and the solvent was removed from the filtrate by vacuum distillation. The resinous product, 185 g., had an epoxide equivalent of 7,014, a melting point of 70° C. and a chlorine content of 4.2.

*Example 5*

Another portion of the product produced according to the first paragraph of the preceding example, 538 g., was dissolved in 250 g. of methyl ethyl ketone and treated with 105 g. of sodium orthosilicate at 85° C. for two hours. Filtration and removal of the solvent by vacuum distillation gave 195 g. of a resinous product with a melting point of 76° C., an epoxide equivalent of 4830, and a chlorine content of 2.1%.

In Examples 1 to 4 two mols of epichlorhydrin were used for one mol of dihydric phenol and the complex resinous products produced contained chlorine. With higher ratios of epichlorhydrin to dihydric phenol, e. g., 2.5 or 3 mols to 1 of dihydric phenol, complex chlorine-containing polyepoxides are similarly obtained of a resinous character.

*Example 6*

107 parts of NaOH was dissolved in 2000 parts of water in a stainless steel container. 285 parts of bisphenol was dissolved in the caustic solution after which 740 parts of the epichlorhydrin glycerol condensate, described in Example 1 of Patent No. 2,581,464, was added at 60° C. Heat was applied, with stirring. One-half hour later at 100° C. a solution of 60 parts NaOH in 400 parts of water was added and the mixture held for another 55 minutes at the boiling point. A solution of 10 parts of NaOH in 75 parts of water was then added and after a further reaction period of 35 minutes at the boiling point, the water was poured off and the resin washed 6 times with large quantities of hot water. The resin was then dried by heating to 155° C. Yield 685 g. of resin, having an epoxide equivalent of 1410 and containing 2.9% chlorine.

The polyhalohydrin ethers derived from the condensation of epihalohydrins with the aforesaid polyhydric phenols have many other uses in addition to their use as intermediates in the preparation of the halogen containing polyepoxides of this invention. For example they can be reacted with alkali metal phenolates (including mono- and polyhydric phenols as well as mixtures of monohydric and polyhydric phenols) to give new resinous materials. This is illustrated in Example 6. By proper choice of reaction proportions, etc. and the use of excess alkali in some cases, the nature of the resinous products can be varied widely. Thus resins can be prepared which are (1) halogen and hydroxyl containing aryl ethers, (2) halogen free hydroxyl containing aryl ethers, and (3) halogen containing epoxy aryl ethers. These resinous products have a variety of uses such as plasticizers for other resins, intermediates for esterification with unsaturated fatty acids to give drying varnishes, esterification with polybasic acids and anhydrides to give infusible resins, etc.

In addition these polyhalohydrin ethers can be reacted with such reagents as sodium bicarbonate, sodium cyanide, sodium thiocyanate, sodium hydrosulfide, sodium sulfide, sodium polysulfides, ammonia, amines, etc. to replace halogen with groups as —OH, —CN, —SCN, —SH, —S, —S$_x$, —NH$_2$, —NHR, —NR$_2$, etc.

The halogen-containing ether epoxide products obtained as described hereinabove have many uses and applications. As is well known to those familiar with the art, epoxides are reactive with many types of chemical compounds and, as a result, are useful as intermediates. For example, epoxides may be reacted with acids, alcohols, amines, amides, mercaptans, phenols, etc., to form a variety of useful products among which are plastics, plasticizing agents, resins, detergents, emulsifying agents, dyes, pharmaceuticals, insecticides, etc. In addition, the halogen-containing ether epoxides contemplated herein may also be reacted through their halogen atom or atoms, whereupon said halogen is replaced by another atom or group.

Another use for said ether epoxide is as a film-forming material. Still another use of the halogen-containing ether epoxides is as a stabilizer for halogen-containing synthetic resins and elastomers, which tend to evolve hydrochloric acid; typical of such resins and elastomers are polyvinyl chloride, polyvinylidene chloride and neoprene (chloroprene polymers). Said ether epoxides may also be used as coatings for metals, as wire coating, and as castings or potting materials. They may also be used as intermediates for preparing addition agents for petroleum fractions, such as lubricating oils.

It is to be understood that the typical examples present hereinabove illustrate the invention and are not to be construed as limitations thereof. Rather, the invention is to be construed in the light of the language of the appended claims.

This application is a continuation-in-part of my prior application Serial No. 774,429, filed September 16, 1947, now Patent No. 2,581,464, which is also a continuation-in-part of my prior application Serial No. 754,080, filed June 11, 1947, now Patent No. 2,538,072.

I claim:

1. A halogen-containing solid, resinous, polyether polyepoxide composition of matter, said composition being a mixture of polyethers of dihydric phenols with a substantial part of the hydroxyl group of the dihydric phenols replaced in part by the group

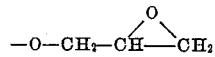

and in part by the group

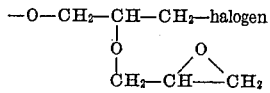

2. A halogen-containing solid, resinous, polyether polyepoxide composition of matter, said composition being a mixture of polyethers of dihydric phenols with the hydroxyl group of the dihydric phenols replaced in part by the group

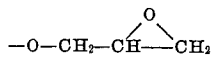

and in part by the group

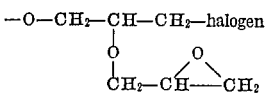

and with part of the hydroxyls of the dihydric phenols replaced by the group.

where $y$ is from 1 to 3.

3. A halogen-containing solid, resinous polyether polyepoxide composition of matter, said composition being a mixture of polyethers of polyhydric phenols, selected from the group which consists of dihydric and trihydric phenols, with a substantial part of the hydroxyl groups of the polyhydric phenols replaced in part by the group

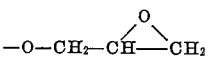

and in part by the group

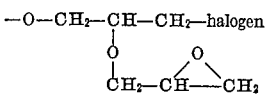

References Cited in the file of this patent
UNITED STATES PATENTS

| | | |
|---|---|---|
| 2,538,072 | Zech | Jan. 16, 1951 |
| 2,575,558 | Newey et al. | Nov. 20, 1951 |
| 2,581,464 | Zech | Jan. 8, 1952 |